US006170262B1

(12) United States Patent
Yoshimura et al.

(10) Patent No.: US 6,170,262 B1
(45) Date of Patent: Jan. 9, 2001

(54) CONTROL DEVICE FOR HYDRAULICALLY DRIVEN EQUIPMENT

(75) Inventors: Hiroshi Yoshimura; Kiwa Nishimura; Koichi Kawamura, all of Hirakata (JP)

(73) Assignee: Komatsu Ltd., Tokyo (JP)

( * ) Notice: Under 35 U.S.C. 154(b), the term of this patent shall be extended for 0 days.

(21) Appl. No.: 09/295,520

(22) Filed: Apr. 21, 1999

(30) Foreign Application Priority Data

Apr. 24, 1998 (JP) .................................................. 10-115791

(51) Int. Cl.[7] ...................................................... F16D 31/02
(52) U.S. Cl. ................................................................ 60/452
(58) Field of Search ........................................ 60/452, 468

(56) References Cited

U.S. PATENT DOCUMENTS 5,537,819 * 7/1996 Kobayashi ............................. 60/468
5,680,760 * 10/1997 Lunzman ............................... 60/468
5,743,089 * 4/1998 Tohji ...................................... 60/452

* cited by examiner

*Primary Examiner*—F. Daniel Lopez
(74) *Attorney, Agent, or Firm*—Armstrong, Westerman, Hattori, McLeland & Naughton

(57) ABSTRACT

The invention relates to a device whereby irrespective of the magnitude of the load the desired maximum flow QM is fed to the hydraulic actuator which drives the working part, thus allowing the working part to work at the desired speed. The flow rate through the flow rate control valves is controlled so that when the operation means is operated beyond a prescribed operating start position, the hydraulic actuators begin to be driven, the flow fed to the hydraulic actuators attaining a prescribed maximum when the operation means is operated to its maximum operating rate, while the rate of change of the flow fed to the hydraulic actuators reaches a prescribed magnitude for each fixed operating rate of the operation means. The rate of change of the flow rate is altered according to the magnitude of the load.

4 Claims, 10 Drawing Sheets

FIG.12 *PRIOR ART*

FIG.13 *PRIOR ART*
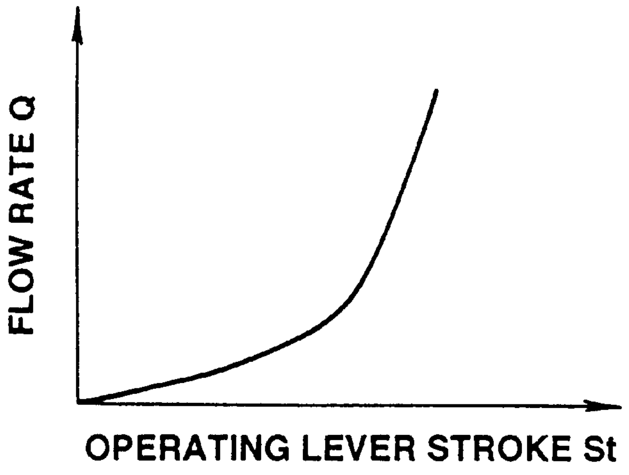
FIG.14 *PRIOR ART*
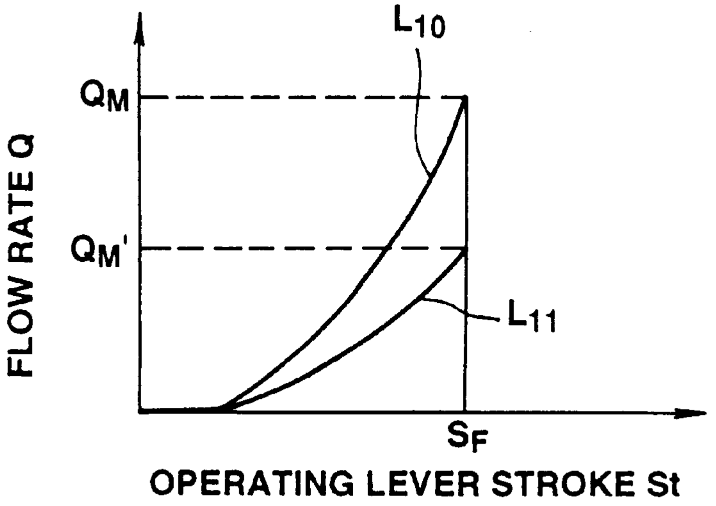

CONTROL DEVICE FOR HYDRAULICALLY DRIVEN EQUIPMENT

BACKGROUND OF THE INVENTION

1. Field of the Invention

The present invention relates to a control device for hydraulically driven equipment, and especially to a device which makes it possible for the levers operating the working parts of construction equipment to be controlled in such a manner as to enhance the operability thereof.

2. Description of the Related Art

When operating the operating lever which is provided in order to drive the boom, arm and other working parts of construction equipment, it is normal to sense the load acting on the working parts from the feel of the operating lever. Correct lever operation in accordance with this is important in enhancing lever operability, and even in improving work efficiency. However, the sense of the load on the working parts which comes from this feel of the operating lever is satisfactory only at the stage where the operating lever is inclined from neutral position through a certain range of stroke positions. If it is inclined as far as full lever position (100% operating rate), whatever the size of the load, it is necessary to feed the maximum desired flow to the hydraulic activator which drives the working part in order to allow that working part to operate at the desired speed.

FIGS. 12–14 illustrate the relationship between lever stroke (operating rate) Sr of the operating lever and the flow Q which is fed to the hydraulic actuator, namely the speed of the hydraulic activator (lever operation characteristics) according to conventional technology. The slope in lever operation characteristics seen in FIGS. 12–14 represents the rate of change ΔQ of the flow Q fed to the hydraulic actuator at a fixed operating rate of the operating lever.

Where the hydraulic pump is operating under so-called negative control and the flow rate control valve is provided with a center bypass circuit (open center), the operation characteristics of the operating lever change, as FIG. 12 shows, in accordance with the load acting on the hydraulic actuator (load acting on the working part).

In other words, the greater the load becomes, the greater the lever stroke position St where the hydraulic actuator starts to move. Thus, the operator is able to sense the load acting on the hydraulic actuator by feeling how far the lever stroke position St where the hydraulic actuator starts to move is removed from the neutral position.

However, the farther the lever stroke position St where the hydraulic actuator starts to move in accordance with the load is removed from the neutral position, the narrower the so-called fine control area becomes. Since fine work is carried out in the fine control area that, it is necessary to guarantee at least a fixed level of stroke range. In this respect, when the load in FIG. 12 becomes greater, the fine control area becomes narrower and it becomes impossible to work with satisfactory lever operability.

Thus, controlling hydraulic pumps by negative control and open center allows the load acting on the working parts to be sensed from the feel of the operating lever, but does not always make it possible to guarantee a satisfactory fine control area, resulting in loss of lever operability in the fine control area.

As FIG. 14 shows, Japanese Patent Application Laid-open No. 6-146344 fixes the lever stroke position St where the hydraulic actuator starts to move, thus guaranteeing a satisfactory fine control area, and allows the load to be sensed by changing the lever operation characteristics in accordance with the load (L10, L11). Similarly, Japanese Patent Publication No. 5-65440 allows the load to be sensed by changing the lever operation characteristics.

Apart from the method of controlling hydraulic pumps by the negative control and open center as described above there is also a method of control by load sensing in pumps which adopt flow control vales with a closed center rather than an open one.

This method of closed-center load-sensing hydraulic pump control has the advantage of good lever operability because even where a plurality of hydraulic actuators of differing load pressure is controlled simultaneously by one hydraulic pump, the speed of the hydraulic actuators can be adjusted simply by the operating rate of the operating lever without reference to engine speed or load pressure.

In other words, as FIG. 13 demonstrates, the lever stroke position St at which the hydraulic actuator begins to move in this method of load-sensing hydraulic pump control. does not depend on the load, but is already fixed. As a result, lever operability in the fine control area is good, but because the lever operation characteristics do not change independently of the load, it proves impossible to sense the load acting on the hydraulic actuator from the operating feel of the lever.

With the method of load-sensing hydraulic pump control described above, the pressure differential between the delivery pressure of the pump and the maximum load pressure of a plurality of hydraulic actuators is controlled in such a manner as to be a desired set pressure differential. Hence, as may be seen from FIG. 13, the lever operation characteristics are fixed.

Consequently, as FIG. 14 shows, by modifying the abovementioned set pressure differential value it is possible to change the lever operation characteristics between L10 and L11. Thus it becomes possible to sense the load if the set pressure differential value is modified accordingly, and the lever operation characteristics are changed between L10 and L11.

However, as will also be seen from FIG. 14, while it is true that changing the lever operation characteristics from L10 to L11 according to the load makes it possible to sense that the rate of change ΔQ of the flow Q fed to the hydraulic actuator at a fixed operating rate of the operating lever has become smaller, and that as a result the load acting on the hydraulic actuator has increased, it becomes impossible to guarantee the desired maximum flow rate QM at full lever position because the whole inclination of the lever operation characteristics becomes smaller.

In other words, when the load is small, the lever operation characteristics are L10, and the flow fed to the hydraulic actuator when the operating lever is operated to full lever position SF (100% operating rate) is QM, allowing the working part to be driven at the desired speed. However, when the load becomes greater and the lever operation characteristics change to L11, the flow fed to the hydraulic actuator falls to QM' even if the operating lever is operated to full lever position SF. In this manner, conventional technology has left no option but to operate the working part at a speed lower than the desired one because the desired maximum flow rate QM is not attained at full lever position SF.

This leads not only to a reduction in lever operability in the full lever area, but also to lower operational efficiency.

SUMMARY OF THE INVENTION

It is an object of the present invention, which has been designed in view of these circumstances, to provide a solution to the problem of ensuring that the working parts operate at the desired speed by fixing independently of the load the stroke position of the operating lever at which the hydraulic actuator begins to move, thus guaranteeing lever operation characteristics in the fine control area, making it possible to sense the load acting on the hydraulic actuator on the basis of the feel of the operating lever, and in addition feeding the desired maximum flow QM to the hydraulic actuator which drives the working part irrespective of the magnitude of the load when the operating lever is operated to full lever position (100% operating rate).

With the purpose of achieving a solution to the above-mentioned problem, a first aspect of the present invention is a control device for hydraulically driven equipment which is provided with hydraulic actuators driven by feeding delivery pressure oil from a hydraulic pump, and flow control valves which feed pressure oil to the corresponding hydraulic actuators at a flow rate dependent upon the operating rate of the operation means, and which is configured in such a manner that the flow rate through the flow control valves is controlled so that when the operation means is operated beyond a prescribed operating start position, the hydraulic actuators begin to be driven, the flow fed to the hydraulic actuators attaining a prescribed maximum when the operation means is operated to its maximum operating rate, while the rate of change of the flow fed to the hydraulic actuators reaches a prescribed level for each fixed operating rate of the operation means, comprising means of detecting operating rate which serve to detect the operating rate of the operation means; means of detecting load which serve to detect the load acting upon the hydraulic actuators; and means of control which on the basis of the results of detection by the means of detecting operating rate serve to control the flow rate through the flow control valves in such a manner that when the operation means is operated until it attains the prescribed maximum operating rate, the rate of change of the flow rate becomes smaller as the load detected by the means of detecting load becomes greater, while at the same time controlling the flow rate through the flow control valves in such a manner that when the operation means is operated until it attains the prescribed maximum operating rate, the flow fed to the hydraulic actuators attains the desired maximum flow rate.

The configuration of this first aspect of the present invention will be explained with reference to FIGS. 1, 4 and 8. As may be seen from FIG. 8, basically in the present invention the flow rate through the flow rate control valve 4 is controlled in such a way that the hydraulic actuator 2 (FIG. 1) begins to be driven when the operation means 6 (FIG. 1) is operated at least as far as the stipulated operation start position Ss; the flow fed to the hydraulic actuator 2 attains the desired maximum flow rate QM when the operation means 6 is operated as far as the maximum operating rate SF; and the rate of change ΔQ of the flow Q fed to the hydraulic actuator at a fixed operating rate of the operation means 6 is of fixed magnitude (lever operation characteristics L2).

In other words, the operating rate St of the operation means 6 is detected, as is the load PL1 acting on the hydraulic actuator 2, and the set pressure differential value ΔPLS corresponding to the rate of change ΔQ is determined from the correspondences shown in FIG. 4. This set pressure differential value ΔPLS becomes smaller as the load PL1 becomes greater. The lever operation characteristics as shown in FIG. 8 change between L2, L3 and L4 in accordance with this set pressure differential value ΔPLS, from L2 to L3 and from L3 to L4 as the set pressure differential value ΔPLS becomes smaller. In other words, as the load PL1 increases, the lever operation characteristics change from L2 to L3 and from L3 to L4, and the rate of change ΔQ of the flow at a fixed lever operating rate becomes smaller.

Thus, by sensing from operation of the lever that the rate of change ΔQ of the flow at a fixed lever operating rate has become smaller (the speed of the working part does not increase in proportion to the operation of the operating lever), the operator is able to detect the increased magnitude of the load PL1 acting on the hydraulic actuator.

Moreover, even when the load PL1 is changed in this manner, the lever stroke position Ss where the hydraulic actuator 2 begins to move remains fixed, and the maximum flow rate QM at full lever position SF is guaranteed.

As has been explained above, the first aspect of the present invention allows lever operability in the fine control area to be guaranteed in relation to the stroke position Ss where the hydraulic actuator 2 begins to move because it is fixed and is not dependent on the load PL1. What is more, since the rate of change ΔQ decreases when it is operated as far as the prescribed operating stroke position, it is possible to sense the load acting on the hydraulic actuator 2 on the basis of the feel of the operating lever. In addition, the fact that the desired maximum flow QM is fed to the hydraulic actuator which drives the working part irrespective of the magnitude of the load means that it is possible to operate the working part at the desired speed.

Meanwhile, a second aspect of the present invention is the control device for hydraulically driven equipment according to claim 1, wherein the hydraulically driven equipment is provided with means of controlling pressure differential which serve to control the pressure differential between the delivery pressure of the hydraulic pump and the load pressure of the hydraulic actuators, the means of control acting to modify the set pressure differential of the means of controlling pressure differential in such a manner that it becomes smaller as the load detected by the means of detecting load becomes greater.

Moreover, a third aspect of the present invention is a control device for hydraulically driven equipment which is provided with hydraulic actuators driven by feeding delivery pressure oil from a hydraulic pump, and flow rate control valves which feed pressure oil to the corresponding hydraulic actuators at a flow rate dependent upon the operating rate of the operation means, and which is configured in such a manner that the flow rate through the flow rate control valves is controlled so that when the operation means is operated beyond a prescribed operating start position, the hydraulic actuators begin to be driven, the flow fed to the hydraulic actuators attaining a prescribed maximum when the operation means is operated to its maximum operating rate, while the rate of change of the flow fed to the hydraulic actuators reaches a prescribed level for each fixed operating rate of the operation means, comprising means of detecting operating rate which serve to detect the operating rate of the operation means; means of detecting load which serve to detect the load acting upon the hydraulic actuators; means of setting which serve to set the correspondence of the rate of change of the flow rate to the operating rate of the operation means and the load detected by the means of detecting load in such a manner that when the operation means is operated until it attains the prescribed maximum operating rate, the rate of change of the flow rate becomes smaller as the load detected by the means of detecting load becomes greater, while at the same time controlling the flow rate through the flow rate control valves in such a manner that when the operation means is operated until it attains the prescribed maximum operating rate, the flow fed to the hydraulic actuators attains the desired maximum flow rate; and means of control which serve to control the flow rate through the flow rate control valves in such a manner that the rate of change of the flow rate in relation to the current operating rate as detected by the means of detecting operating rate and the current load as detected by the means of detecting load is determined on the basis of the correspondence set by the means of setting, and the determined rate of change of the flow rate is attained.

Furthermore, a fourth aspect of the present invention is the control device for hydraulically driven equipment according to claim 3, wherein the hydraulically driven equipment is provided with means of controlling pressure differential which serves to control the pressure differential between the delivery pressure of the hydraulic pump and the load pressure of the hydraulic actuators, the correspondence of the set pressure differential to the operating rate of the operation means and the load detected by the means of detecting load being set by the means of setting, and the means of control acting to determine the set pressure differential in relation to the current operating rate as detected by the means of detecting operating rate and the current load as detected by the means of detecting load on the basis of the correspondence set by the means of setting, the set pressure differential of the means of controlling pressure differential being modified to the determined set pressure differential.

BRIEF DESCRIPTION OF THE DRAWINGS

FIG. 12 is a diagram representing the lever operation characteristics when the conventional method of controlling a hydraulic pump by means of negative control and open center is adopted;

FIG. 13 is a diagram representing the lever operation characteristics when the conventional method of controlling a load-sensing hydraulic pump of the closed center type is adopted; and FIG. 14 is a diagram illustrating examples of modifications to conventional lever operation characteristics.

DESCRIPTION OF THE PREFERRED EMBODIMENTS

There follows a detailed description of the preferred embodiments of the present invention.

Figure 1A:
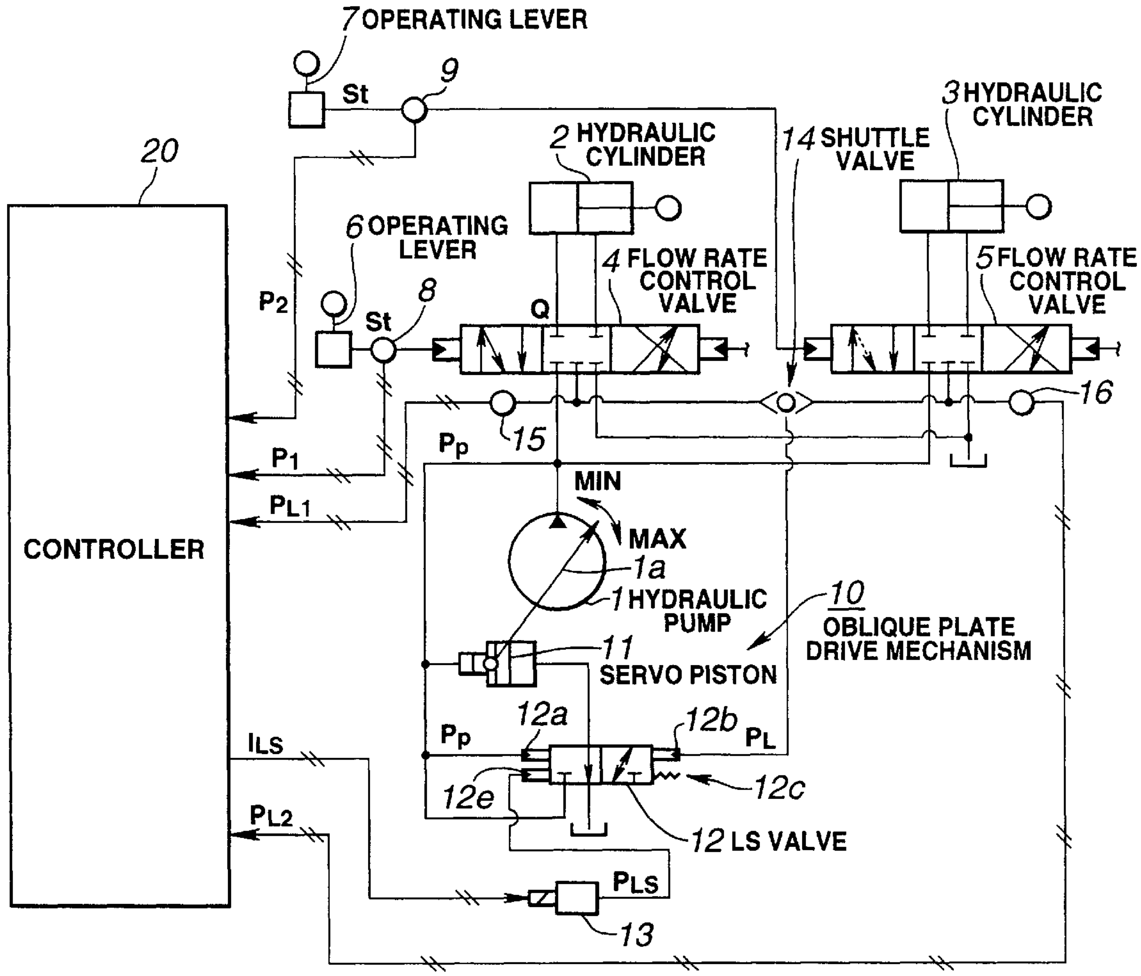
FIGS. 1(*a*) and 1(*b*) are hydraulic circuitry diagrams illustrating an aspect of the control device for hydraulically operated equipment to which the present invention pertains.
Figure 1B:
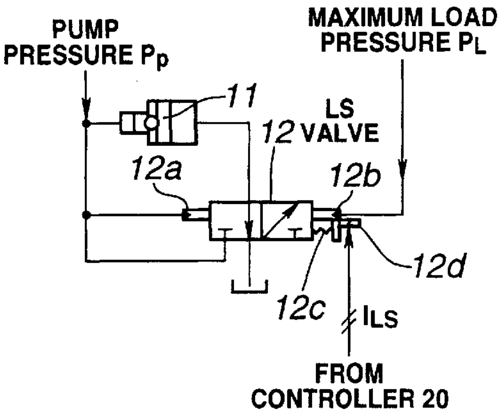

FIG. 1 shows hydraulic circuitry diagrams illustrating the control device for hydraulically operated equipment envisaged in the present aspect.

As FIG. 1 shows, this control device comprises, broadly speaking, a variable capacity type hydraulic pump 1 driven by an engine (not depicted in the drawing); a pilot pump (not depicted in the drawing) driven by the same engine and delivering pilot pressure oil; hydraulic cylinders 2, 3 driven by virtue of influx of oil delivered by the hydraulic pump 1; flow rate control valves 4, 5 whereof the aperture area A varies in accordance with the spool stroke position, thus causing the flow of pressure oil delivered from the hydraulic pump 1 to change and feeding it to each of the corresponding hydraulic cylinders 2, 3; operating levers 6, 7 acting as hydraulic levers which serve to operate the spool stroke positions of the abovementioned flow rate control valves 4, 5; a pressure sensor 8 which detects the lever stroke St of the operating lever 6; a pressure sensor 9 which detects the lever stroke St of the operating lever 7; an oblique plate drive mechanism 10 acting as means of load sensing control which controls the angle of incline of an oblique plate 1*a* in the hydraulic pump 1, which is to say the pump displacement volume q (cc/rev), in such a manner that the pressure differential ΔPLS between the delivery pressure Pp of the hydraulic pump 1 and the maximum load pressure PL among the load pressures PL1, PL2 of the abovementioned hydraulic actuators 2, 3 is the set pressure differential value ΔPLS; a pressure sensor 15 which serves to detect the load pressure PL1 of the hydraulic cylinder 2 as pilot pressure emitted from a load pressure oil outlet port with which the flow rate control valve 4 is provided; a pressure sensor 16 which similarly serves to detect the load pressure PL2 of the hydraulic cylinder 3 as pilot pressure emitted from a load pressure oil outlet port with which the flow rate control valve 5 is provided; and a controller 20 which inputs pilot pressure signals p1, p2 which represent the respective operating rates St of the operating levers 6, 7 as detected by the pressure sensors 8, 9, while also inputting signals which represent the respective load pressures PL1, PL2 of the pressure cylinders 2, 3 as detected by the pressure sensors 15, 16, generates an electric current command ILS as described below for the purpose of changing the set pressure differential value ΔPLS, and outputs this to the oblique plate drive mechanism 10, thus changing the set pressure differential value ΔPLS.

There follows a more detailed description.

When the operating lever 6 is operated, a pressure-reducing valve which is attached to the operating lever 6 reduces the pressure of the pilot pressure oil delivered from the pilot pump to a pressure in line with the operating rate St. In this manner, pilot pressure oil displaying the operating rate St of this operating lever 6 is fed to whichever of the input ports of the flow rate control valve 4 corresponds to the direction of the lever operation, thus changing the spool stroke of the flow rate control valve 4.

The pressure sensor 8 detects as pilot pressure p1 the operating rate St when the operating lever 6 is operated on the side which causes the rod of the hydraulic cylinder 2 to extend. It should be pointed out that the pressure sensor which detects as pilot pressure p1 the operating rate St when the operating lever 6 is operated on the side which causes the rod of the hydraulic cylinder 2 to retract has been omitted from the drawing. The rod of the hydraulic cylinder 2 is connected, for instance, to a boom which constitutes a working part of construction equipment.

Similarly, when the operating lever 7 is operated, a pressure-reducing valve which is attached to the operating lever 7 reduces the pressure of the pilot pressure oil delivered from the pilot pump to a pressure in line with the operating rate St. In this manner, pilot pressure oil displaying the operating rate St of this operating lever 7 is fed to whichever of the input ports of the flow rate control valve 5 corresponds to the direction of the lever operation, thus changing the spool stroke of the flow rate control valve 5.

The pressure sensor 9 detects as pilot pressure p1 the operating rate St when the operating lever 7 is operated on the side which causes the rod of the hydraulic cylinder 3 to extend. It should be pointed out that the pressure sensor which detects as pilot pressure p1 the operating rate St when the operating lever 7 is operated on the side which causes the rod of the hydraulic cylinder 3 to retract has been omitted from the drawing. The rod of the hydraulic cylinder 3 is connected, for instance, to a bucket which constitutes a working part of construction equipment.

Having passed through the respective load pressure sampling ports of the flow rate control valves 4, 5, the pressure oil is linked to the shuttle valve 14, from which is output the higher pressure from among the load pressure PL1 of the hydraulic cylinder 2 and the load pressure PL2 of the hydraulic cylinder 3, which is to say the pressure oil displaying the greatest load pressure PL.

The oblique plate drive mechanism 10, which controls load sensing, comprises a servo piston 11 which drives the oblique plate 1*a* of the hydraulic pump 1, and an LS valve (load sensor valve) 12 which allows the pressure oil to act on the servo piston 11.

A pilot pressure signal displaying the delivery pressure Pp of the hydraulic pump 1 is input by way of a pilot line to an input port 12*a* on the left-hand side of the LS valve 12 as illustrated in the drawing. Similarly, a pilot pressure signal displaying the maximum load pressure PL of the hydraulic cylinders 2, 3 is input from the shuttle port 14 by way of a pilot line to an input port 12*b* on the right-hand side of the LS valve 12. Meanwhile, force is applied to the right-hand side of the LS valve 12 thanks to a spring 12*c*. Furthermore, pilot pressure PLS is applied to the left-hand side of the LS valve 12 in response to the command current ILS output from the controller 20. The command current ILS, which is output from the controller 20 with the purpose of changing the pressure differential setting, is converted by virtue of an electromagnetic ratio control valve 13 into the pilot pressure PLS, and is fed to an input port 12*e* on the left-hand side of the LS valve.

The oblique plate drive mechanism 10 changes the oblique plate 1*a* of the variable capacity type hydraulic pump 1 in such a manner that the pressure differential ΔP between the pressures Pp and PL (Pp−PL) is maintained at the set pressure differential value PLS, which depends on the difference between spring force and pilot pressure PLS.

In other words, if the pressure differential Pp−PL is smaller than the set value ΔPLS, namely if the maximum load pressure PL rises, the LS valve 12 is depressed on the left-hand side, as a result of which the servo piston 11 is driven to the left and the oblique plate 1*a* of the hydraulic pump 1 is shifted to the maximum angle of incline MAX side. This means that the displacement volume q of the hydraulic pump 1 is increased, as is the flow delivered from the hydraulic pump 1. Meanwhile, the increased flow from the hydraulic pump 1 causes the delivery pressure Pp to rise, pressure pushing the LS valve 12 to the right increases, the servo piston 11 is driven to the right and the oblique plate 1*a* of the hydraulic pump 1 is shifted to the minimum angle of incline MIN side. In short, the oblique plate 1*a* of the hydraulic pump 1 is controlled in such a manner that the force comprising the set pressure differential value ΔPLS, which depends on the difference between spring force and pilot pressure PLS, added to the maximum load pressure PL balances the delivery pressure Pp of the hydraulic pump 1.

FIG. 1(*b*) illustrates another example of a configuration whereby force corresponding to the command current ILS is applied to the LS valve 12.

In FIG. 1(*b*), the command current ILS output from the controller 20 is applied to an electromagnetic solenoid 12*d* which generates force pushing against the spring 12*c* on the right-hand side of the LS valve 12. Thus, when the command current ILS is output from the controller 20, thrust proportional to the magnitude of the command current ILS is generated by the electromagnetic solenoid 12*d*, as a result of which the spring force of the spring 12*c* is changed, as also is the set pressure differential value ΔPLS. It should be added that it is desirable for the initial spring force of the spring 12 to be programmed weak when the command current ILS is off.

There follows an explanation of the relationship between the abovementioned set pressure differential value ΔPLS and the lever operation characteristics illustrated in FIG. 14.

Now, if Q is the flow rate passing through the restrictions of the flow rate control valves 4, 5, c is a flow rate constant, A is the aperture area of the restrictions of the flow rate control valves 4, 5, and ΔP is the pressure differential fore and aft of the flow rate control valves 4, 5, the following relationship obtains.

$$Q=c\cdot A\cdot\sqrt{(\Delta P)} \qquad (1)$$

Since the pressure differential ΔP fore and aft of the flow rate control valves 4, 5 is determined by the set pressure differential value PLS as explained above, if the set pressure differential value ΔPLS is fixed, so is the pressure differential ΔP, and it follows that the flow Q fed to the hydraulic cylinders 2, 3 is proportional to the aperture area A of the flow rate control valves 4, 5, which is to say to the lever stroke St of the operating levers 6, 7. The lever operation characteristics in this case are L10. If the set pressure differential value ΔPLS becomes smaller, so does the pressure differential ΔP, and it follows that the flow Q fed to the hydraulic cylinders 2,3 becomes smaller. The lever operation characteristics in this case are L11. In other words, by reducing the set pressure differential value ΔPLS, it is possible to modify lever operation characteristics L11 with a small flow rate Q (lever operation characteristics L11 with a small rate of change of flow rate Q per unit operating rate) even if the lever operating rate St (aperture area A) is the same.

Figure 3:
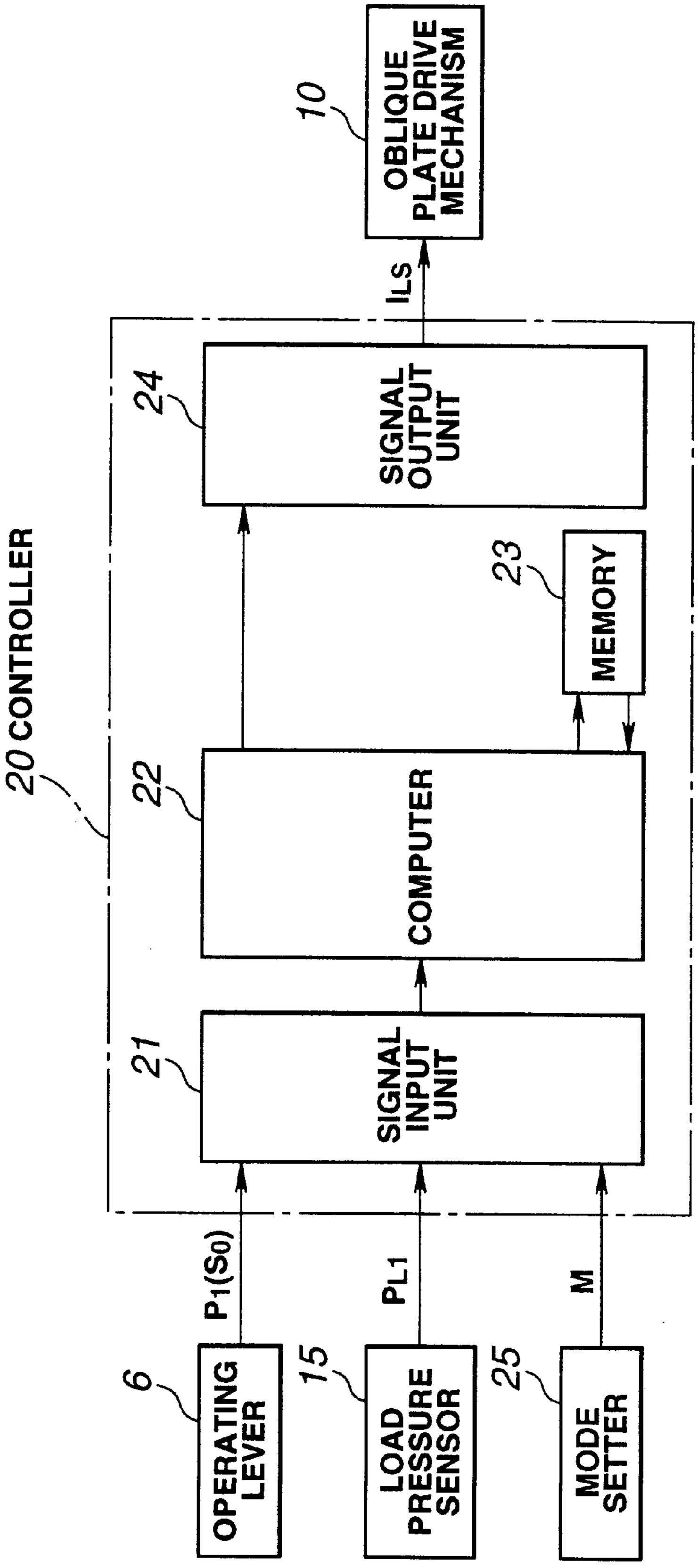
FIG. 3 is a block diagram illustrating the function of the controller.

There follows a description of the process implemented by the controller 20, with reference also to FIG. 3, which is a block diagram illustrating its function. In the description which follows, the operation of the operating lever 16 and consequent action of the hydraulic cylinder 2 are taken as representative. Control is implemented in the same manner during operation of the operating lever 17 and consequent action of the hydraulic cylinder 3.

Figure 11:
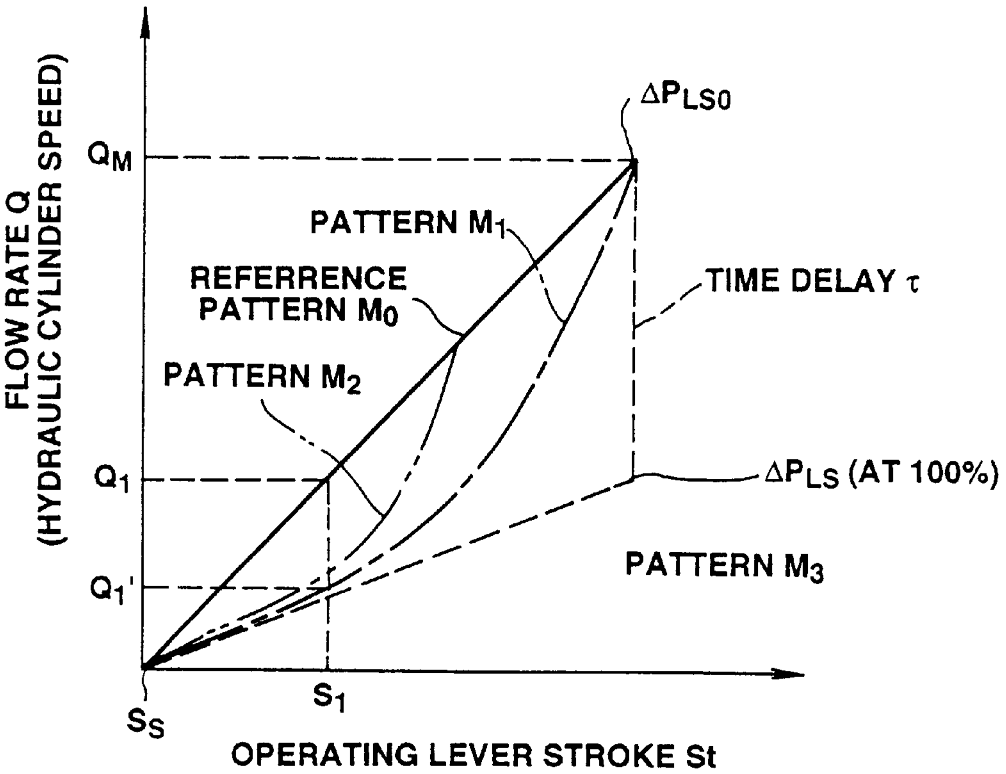
FIG. 11 is a diagram comparing the lever operation characteristics represented in FIGS. 8, 9 and 10 with conventional lever operation characteristics.
Figure 11:
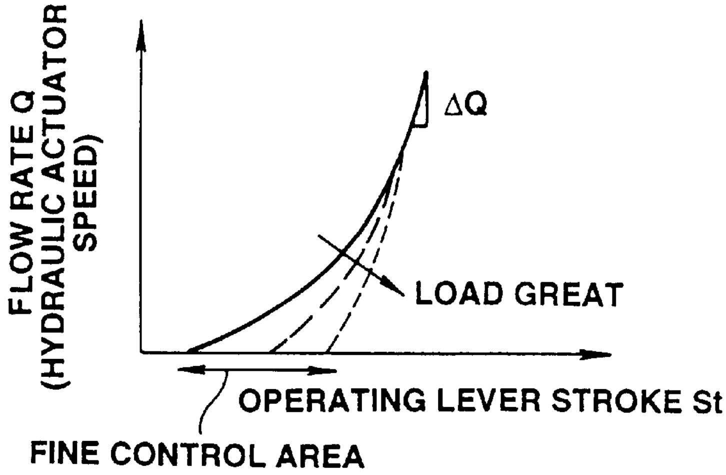

As FIG. 3 shows, a pilot pressure signal p1 representing the operating rate St of the operating lever 6, a signal representing the load pressure PL1 detected by the load pressure sensor 15, and a mode signal M representing one of the modes M0, M1, M2, M3 selected by the mode setter 25 are input to the signal input unit 21 of the controller 20. Once A/D conversion and other processing have been implemented, they are input to the computer 22. The mode setter 25 is a switch which serves to select the lever operation characteristics of the operating lever 6 in the form of the modes M0, M1, M2, M3. If mode M0 is selected, the reference pattern M0 illustrated in FIG. 11 is obtained as the lever operation characteristics. Selecting mode M1 gives the lever operation characteristics pattern M1 illustrated in FIG. 11, while selecting modes M2 and M3 gives the lever operation characteristics patterns M2 and M3 respectively. Mode M0 is selected when there is no need to sense the load acting on the working parts from the feel of the operating lever 6.

The computer 22 reads the set pressure differential value ΔPLS corresponding to the current lever stroke St of the operating lever 6 and the load pressure PL1 of the hydraulic cylinder 2 from the contents of memory tables stored in the memory 23, and calculates the command current ILS required to obtain this set pressure differential value ΔPLS. This is fed to the signal output unit 24, which implements D/A conversion and other processing on the command current ILS determined by the computer, and outputs this command current ILS by way of an electric signal line to the electromagnetic ratio control valve 13. In this manner, the set pressure differential value ΔPLS of the LS valve 12 of the oblique plate drive mechanism 10 is modified.

Figure 5A:
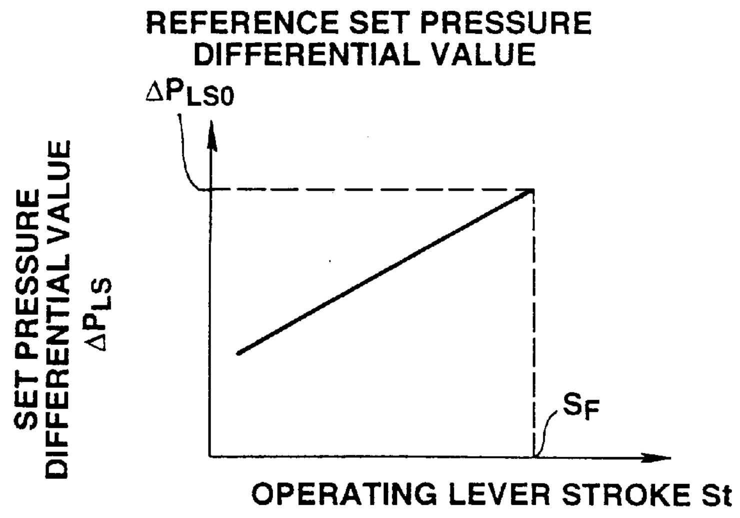
FIGS. 5(*a*), 5(*b*) and 5(*c*) are diagrams illustrating the relationship between operating lever stroke, load and pressure differential level.
Figure 5B:
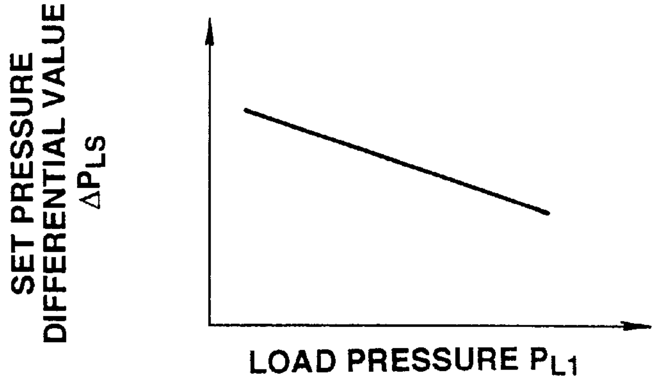
Figure 5C:
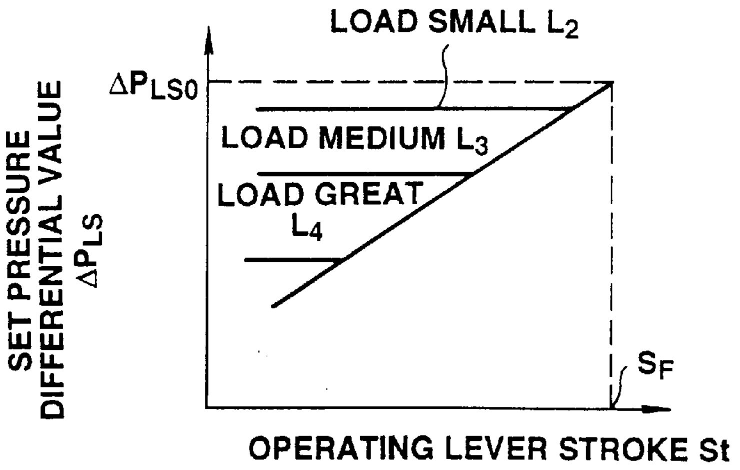
Figure 6A:
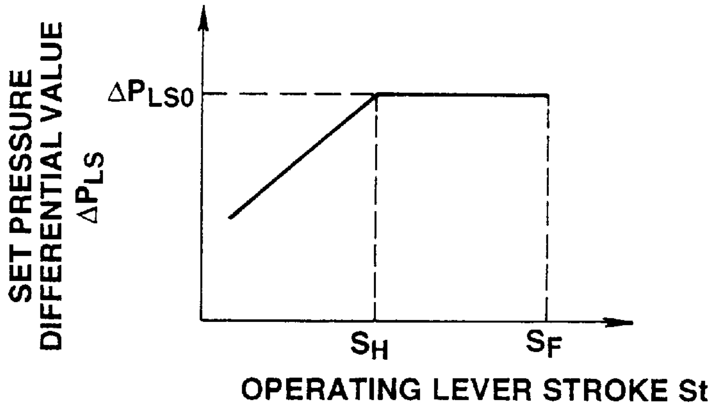
FIGS. 6(*a*), 6(*b*) and 6(*c*) are diagrams illustrating the relationship between operating lever stroke, load and pressure differential level.
Figure 6B:
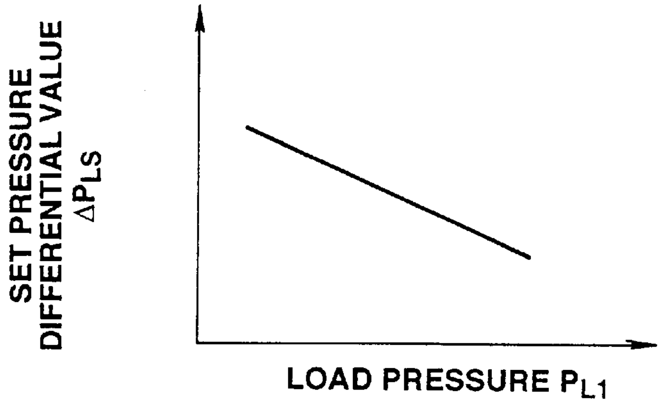
Figure 6C:
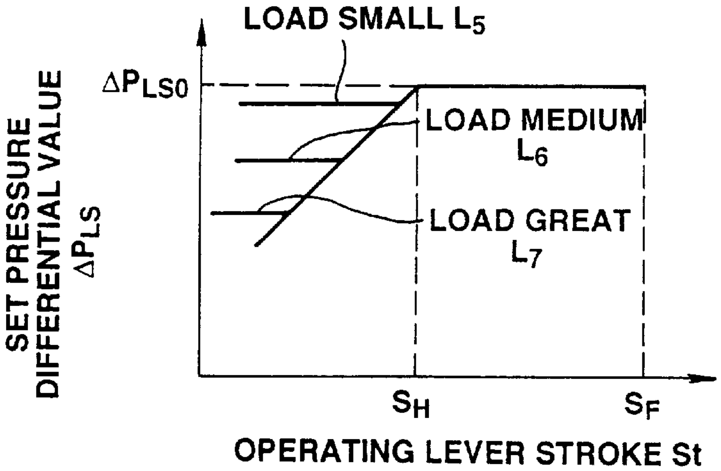
Figure 7A:
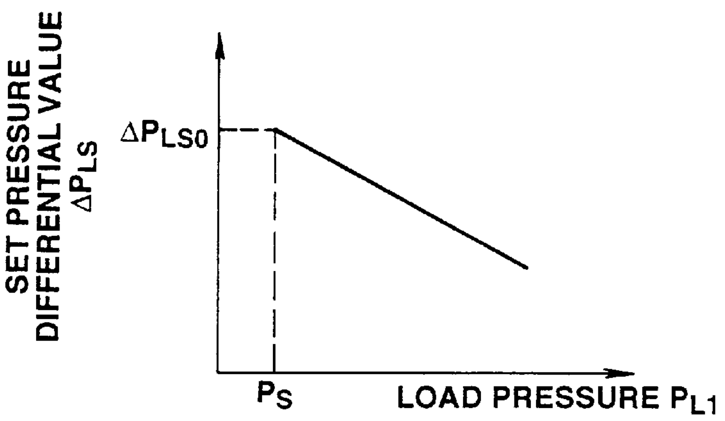
FIGS. 7(*a*) and 7(*b*) are diagrams illustrating the relationship between pressure differential level and delay time when the operating lever is operated to full lever position.
Figure 7B:
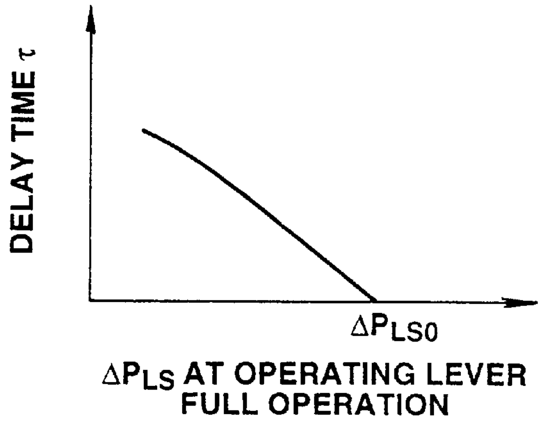

The memory 23 houses a memory table of the content illustrated in FIGS. 5(*a*), (*b*) and corresponding to the operating lever characteristics M1, a memory table of the content illustrated in FIGS. 6(*a*), (*b*) and corresponding to the operating lever characteristics M2, and a memory table of the content illustrated in FIGS. 7(*a*), (*b*) and corresponding to the operating lever characteristics M3.

Now, the description which follows takes as an example what happens when mode M1 is selected by the mode setter 25.

In this case, the memory table of the content illustrated in FIGS. 5(*a*), (*b*) is selected by the computer 22.

Figure 8:
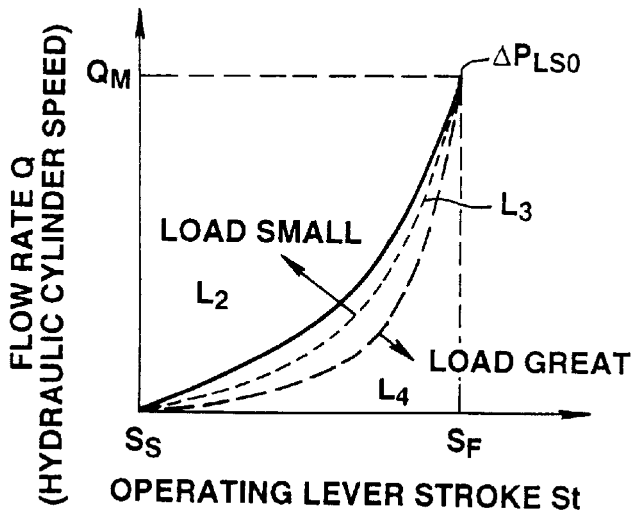
FIG. 8 is a diagram representing the lever operation characteristics which are obtained from the relationship illustrated in FIG. 5.

FIG. 5(*a*) illustrates the correspondences whereby the set pressure differential value ΔPLS increases in proportion to the operating lever stroke St. The set pressure differential value ΔPLS when the operating lever 6 is operated to the full lever position SF is the reference set pressure differential value ΔPLS0. If the operating lever 6 is in the full lever position SF and the set pressure differential value ΔPLS is the reference set pressure differential value ΔPLS0, as illustrated in FIG. 8, the desired maximum flow rate QM is obtained as the flow Q fed to the hydraulic cylinder 2.

FIG. 5(*b*) illustrates the correspondences whereby the set pressure differential value ΔPLS decreases in proportion to the load pressure PL1 of the hydraulic cylinder 2.

From the correspondences illustrated in FIG. 5(*a*), the computer 22 first determines the set pressure differential value ΔPLS corresponding to the current detected lever stroke St of the operating lever 6. From the correspondences illustrated in FIG. 5(*b*) it then determines the set pressure differential value ΔPLS corresponding to the current detected load pressure PL1 of the hydraulic cylinder 2.

Finally, it determines the greater of these two set pressure differential values ΔPLS.

FIG. 5(*c*) summarizes the correspondences illustrated in FIG. 5(*a*) and FIG. 5(*b*). L2 represents the correspondence between the operating lever stroke St and the set pressure. differential value ΔPLS when the load pressure PL1 is small, L3 the correspondence between the operating lever stroke St and the set pressure differential value ΔPLS when the load pressure PL1 is medium, and L4 the correspondence between the operating lever stroke St and the set pressure differential value ΔPLS when the load pressure PL1 is great.

As a result of the outputting of the command current ILS from the controller 20, the set pressure differential value of the LS valve 12 of the oblique plate drive mechanism 10 is modified to the set pressure differential value ΔPLS determined by the computer 22. The pressure differential ΔP fore and aft of the rate flow control valve 4 is modified in line with this, and the flow Q fed to the hydraulic cylinder 2 is changed, as is the rate of change ΔQ of the flow at a fixed lever operating rate.

FIG. 8 represents the lever operation characteristics obtained in accordance with FIGS. 5(*a*), (*b*).

L2 represents the lever operation characteristics when the load pressure PL1 is small, L3 the lever operation characteristics when the load pressure PL1 is medium, and L4 the lever operation characteristics when the load pressure PL1 is great.

In this manner, for a level operating rate lower than a particular value, the lever operation characteristics change from L2 to L3 and from L3 to L4, and the rate of change ΔQ of the flow at a fixed lever operating rate becomes smaller. As a result, the operator is able to sense from operating the operating lever 6 that the rate of change ΔQ of the flow at a fixed lever operating rate has become smaller, and the speed of the working part does not increase in proportion to the amount by which the operating lever is operated, thus detecting that the load PL1 acting on the hydraulic cylinder 2 has become greater.

Moreover, even when the load PL1 is changed in this manner, the lever stroke position Ss where the hydraulic actuator 2 begins to move remains fixed, and the maximum flow rate QM at full lever position SF is guaranteed.

Figure 4:
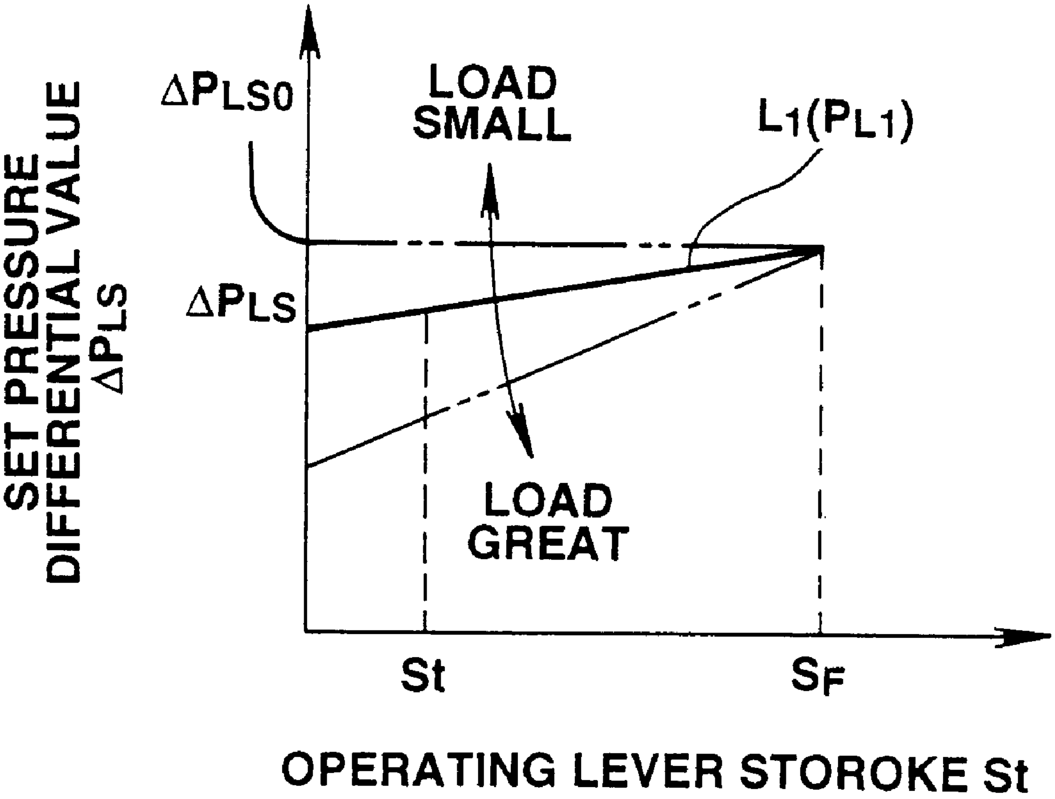
FIG. 4 is a diagram illustrating the relationship between operating lever stroke, load and pressure differential level.

In the above description, the set pressure differential value ΔPLS has been determined on the basis of the correspondences illustrated in FIGS. 5(*a*), (*b*), but the correspondences illustrated in FIG. 4 may be used instead of these in order to determine the set pressure differential value ΔPLS.

In FIG. 4, the correspondences L1 (PL1) between the operating lever stroke St and the set pressure differential value ΔPLS are set for each value of the load pressure PL1. First, the correspondence L1 (PL1) for the current detected load pressure PL1 is selected. After that, the selected correspondence L1 (PL1) is used to determine the set pressure differential value ?PLS corresponding to the current detected operating lever stroke St.

Determining the set pressure differential value ΔPLS thus according to the correspondences illustrated in FIG. 4 also allows the lever operation characteristics L2, L3, L4 illustrated in FIG. 8 to be obtained.

The description which follows next takes as an example what happens when mode M2 is selected by the mode setter 25.

In this case, the memory table of the content illustrated in FIGS. 6(*a*), (*b*) is selected by the computer 22.

FIG. 6(*a*) illustrates the correspondences whereby the set pressure differential value ?PLS increases in proportion to the operating lever stroke St until attaining the half lever position SH. The set pressure differential value ΔPLS when the operating lever 6 is operated to the half lever position SH is the reference set pressure differential value ΔPLS0.

FIG. 6(*b*) illustrates the correspondences whereby the set pressure differential value ΔPLS decreases in proportion to the load pressure PL1 of the hydraulic cylinder 2.

From the correspondences illustrated in FIG. 6(*a*), the computer 22 first determines the set pressure differential value ΔPLS corresponding to the current detected lever stroke St of the operating lever 6. From the correspondences illustrated in FIG. 6(*b*) it then determines the set pressure differential value ΔPLS corresponding to the current detected load pressure PL1 of the hydraulic cylinder 2.

Finally, it determines the greater of these two set pressure differential values ΔPLS.

FIG. 6(*c*) summarizes the correspondences illustrated in FIG. 6(*a*) and FIG. 6(*b*). L5 represents the correspondence between the operating lever stroke St and the set pressure differential value ΔPLS when the load pressure PL1 is small, L6 the correspondence between the operating lever stroke St and the set pressure differential value ΔPLS when the load pressure PL1 is medium, and L7 the correspondence between the operating lever stroke St and the set pressure differential value ΔPLS when the load pressure PL1 is great.

As a result of the outputting of the command current ILS from the controller 20, the set pressure differential value of the LS valve 12 of the oblique plate drive mechanism 10 is modified to the set pressure differential value ΔPLS determined by the computer 22. The pressure differential ΔP fore and aft of the rate flow control valve 4 is modified in line with this, and the flow Q fed to the hydraulic cylinder 2 is changed, as is the rate of change ΔQ of the flow at a fixed lever operating rate.

Figure 9:
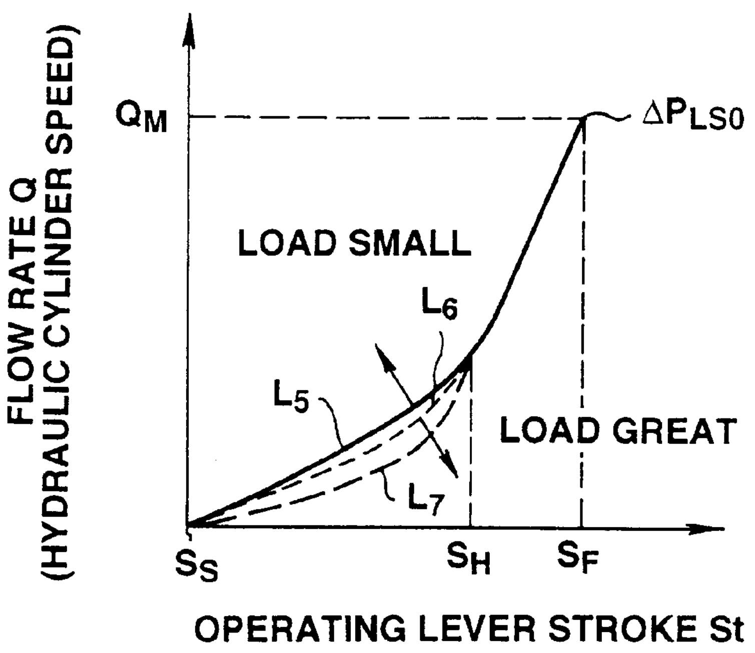
FIG. 9 is a diagram representing the lever operation characteristics which are obtained from the relationship illustrated in FIG. 6.

FIG. 9 represents the lever operation characteristics obtained in accordance with FIGS. 6(*a*), (*b*).

L5 represents the lever operation characteristics when the load pressure PL1 is small, L6 the lever operation characteristics when the load pressure PL1 is medium, and L7 the lever operation characteristics when the load pressure PL1 is great.

In this manner, for a level operating rate lower than a particular value, the lever operation characteristics change from L5 to L6 and from L6 to L7, and the rate of change ΔQ of the flow at a fixed lever operating rate becomes smaller within the operating range up to half lever position SH. As a result, the operator is able to sense from operating the operating lever 6 that the rate of change ΔQ of the flow at a fixed lever operating rate has become smaller, and the speed of the working part does not increase in proportion to the amount by which the operating lever is operated, thus detecting that the load PL1 acting on the hydraulic cylinder 2 has become greater.

Moreover, even when the load PL1 is changed in this manner, the lever stroke position Ss where the hydraulic actuator 2 begins to move remains fixed. From half lever position SH to full lever position SF the lever can be operated with the same characteristics as the conventional lever operation characteristics M0, and maximum flow rate QM at full lever position SF is guaranteed.

The description which follows next takes as an example what happens when mode M3 is selected by the mode setter 25.

In this case, the memory table of the content illustrated in FIGS 7(*a*), (*b*) is selected by the computer 22.

FIG. 7(*a*) illustrates the correspondences whereby the set pressure differential value ΔPLS decreases in proportion to the load pressure PL1 of the hydraulic cylinder 2.

FIG. 7(*b*) illustrates the relationship between the set pressure differential value ΔPLS when the operating lever 6 is operated to full lever position SF and the delay time X required in order to raise this set pressure differential value ΔPLS to the reference set pressure differential value ΔPLS0.

From the correspondences illustrated in FIG. 7(*a*), the computer 22 first determines the set pressure differential value ΔPLS corresponding to the current detected load pressure PL1 of the hydraulic cylinder 2. On the basis of the detected stroke St of the operating lever 6 it then judges whether or not it has been operated as far as full lever position SF. At such time as it judges that this has been attained, it then determines from the correspondences illustrated in FIG. 7(*b*) the delay time τ corresponding to the set pressure differential value ?PLS during operation at full lever position.

As a result of the outputting of the command current ILS from the controller 20, the set pressure differential value of the LS valve 12 of the oblique plate drive mechanism 10 is modified to the set pressure differential value ΔPLS determined by the computer 22. The pressure differential ΔP fore and aft of the rate flow control valve 4 is modified in line with this, and the flow Q fed to the hydraulic cylinder 2 is changed, as is the rate of change ΔQ of the flow at a fixed lever operating rate. At such time as the operating lever 6 is operated to full lever position SF, the set pressure differential value ΔPLS is raised at a fixed ratio by the interval of the delay time τ, and the reference set pressure differential value ΔPLS0 is modified.

Figure 10:
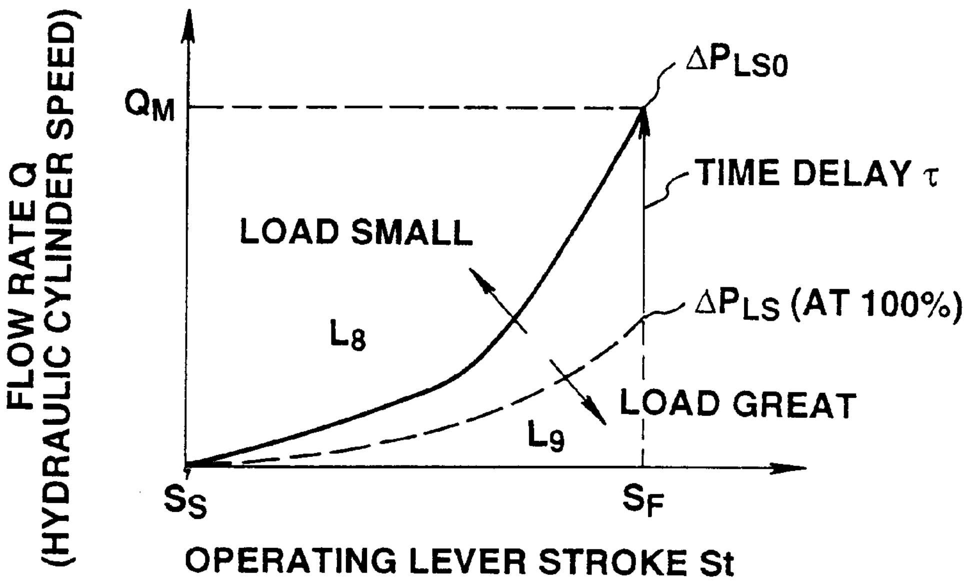
FIG. 10 is a diagram representing the lever operation characteristics which are obtained from the relationship illustrated in FIG. 7.

FIG. 10 represents the lever operation characteristics obtained in accordance with FIGS. 7(*a*), (*b*).

L8 represents the lever operation characteristics when the load pressure PL1 is small, and L9 the lever operation characteristics when the load pressure PL1 is great.

In this manner, the lever operation characteristics change from L8 to L9, and the rate of change ΔQ of the flow at a fixed lever operating rate becomes smaller within the operating range up to full lever position SF. As a result, the operator is able to sense from operating the operating lever 6 that the rate of change ΔQ of the flow at a fixed lever operating rate has become smaller, and the speed of the working part does not increase in proportion to the amount by which the operating lever is operated, thus detecting that the load PL1 acting on the hydraulic cylinder 2 has become greater.

Moreover, even when the load PL1 is changed in this manner, the lever stroke position Ss where the hydraulic actuator 2 begins to move remains fixed.

At such time as the operating lever 6 is operated to full lever position SF, the set pressure differential value ΔPLS is raised at a fixed ratio by the interval of the delay time τ, and the reference set pressure differential value ΔPLS0 is modified. As a result, maximum flow rate QM at full lever position SF is guaranteed.

FIG. 11 compares the conventional lever operation characteristics M0, where the relationship between the operating lever stroke St and the flow rate Q is fixed irrespective of the magnitude of the load PL1, with the lever operation characteristics M1 illustrated in FIG. 8, the lever operation characteristics M2 illustrated in FIG. 9, and the lever operation characteristics M3 illustrated in FIG. 10.

As is shown in FIG. 11, compared with the conventional lever operation characteristics M0, the lever operation characteristics M1, M2 and M3 all have smaller rates of change ΔQ of the flow at a fixed lever operating rate in accordance with the magnitude of the load PL1, at least up to half lever position SH. For instance, if the lever operation characteristics M1 are compared with the conventional lever operation characteristics M0, it will be seen that even at the same lever stroke S1, the resultant flow rate has fallen from Q1 to Q1=(the speed of the hydraulic cylinder 2 has fallen), and as a result it is possible to sense the load acting on the hydraulic cylinder 2.

In this manner, the present aspect allows lever operability in the fine control area to be guaranteed in relation to the stroke position Ss where the hydraulic actuator 2 begins to move because it is fixed and is not dependent on the load PL1. What is more, since the rate of change ΔQ of the flow rate decreases when it is operated as far as the prescribed operating stroke position, it is possible to sense the load acting on the hydraulic actuator 2 on the basis of the feel of the operating lever 6. In addition, when the operating lever 6 is operated to full lever position SF, it is possible to operate the boom at the desired speed because irrespective of the magnitude of the load PL1 the desired maximum flow QM is fed to the hydraulic cylinder 2 which drives the boom.

It should be added that the above aspect has envisaged the selection of one of the lever operation characteristics M0–M3, but of course it is also permissible to fix the lever operation characteristics in such a manner that one or other of the lever operation characteristics M1, M2 or M3 is always attained.

As FIG. 1 shows, in the above aspect the aim has been to modify the set pressure differential value ΔPLS of the oblique plate drive mechanism 10 in order to obtain lever operation characteristics which allow the load to be sensed. However, instead of modifying the set pressure differential value ΔPLS it is also possible to achieve the same lever operation characteristics by modifying the drive command to the flow rate control valve 4.

Figure 2:
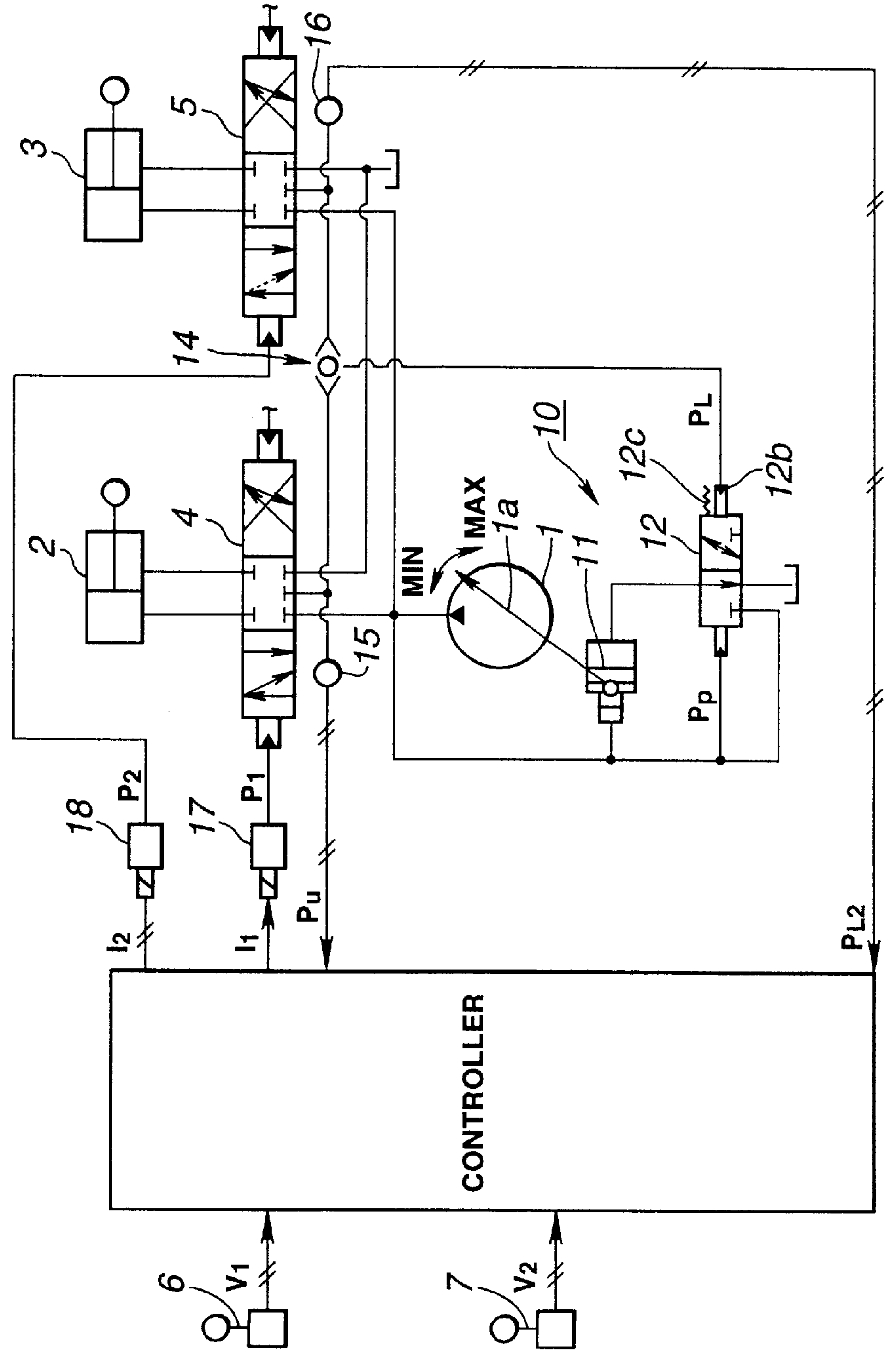
FIG. 2 is a hydraulic circuitry diagram illustrating a different aspect from the one illustrated in FIG. 1.

FIG. 2 illustrates the hydraulic circuitry in this case.

To explain the places which differ from FIG. 1, the operating levers 6, 7 are electric levers, and electric signals V1, V2 representing the operating strike position 6 are input to the controller 20. Command currents I1, I2 are output from the controller 20 to each of the flow rate control valves 4, 5. The command currents I1, I2 are converted by the electromagnetic ratio control valves 17, 18 into the pilot pressures p1, p2 respectively. Pilot pressure oil of these pilot pressures p1, p2 is fed respectively to the input ports of the flow rate control valves 4, 5, as a. result of which the spool stroke positions of the flow rate control valves 4, 5 are changed. In this manner the flow rate Q through the flow rate control valves 4, 5 is modified, and lever operation characteristics are obtained which allow the load to be sensed. No command current ILS is fed to the LS valve 12 of the oblique plate drive mechanism 10 in order to modify the set pressure differential value ΔPLS.

There follows a description of the process implemented by the controller 20, in which the case where the operation of the operating lever 16 and consequent action of the hydraulic cylinder 2 are taken as representative.

The computer 22 within the controller 20 determines the set pressure differential value ΔPLS on the basis of the detected lever stroke St (electric signal V1) and the detected load pressure PL1 as in the previous aspect.

Rendering the set pressure differential value ΔPLS into a value smaller than the reference set pressure differential value ΔPLS0 is equivalent to multiplying the pressure differential ΔP in the aforesaid formula (1)

$$Q=c\cdot A\cdot\sqrt{(\Delta P)} \qquad (1)$$

by a correction factor K smaller than 1. In other words, if in the formula $$Q=c\cdot A\cdot K\cdot\sqrt{(\Delta P)} \qquad (2)$$

the correction factor is set at a value smaller than 1, it is possible to decease the flow rate Q even if the lever stroke St (A) is the same. In practice this means that it has been possible to modify the set pressure differential value ΔPLS into a value smaller than the reference set pressure differential value ΔPLS0.

The set pressure differential value ΔPLS determined by the computer 22 on the basis of the of the detected lever stroke St (electric signal V1) and the detected load pressure PL1 is now converted into the abovementioned correction factor K, and the command current I1 (A·K) is output from the controller 20 to the flow rate control valve 4. It should be added that if the set pressure differential value ΔPLS is the same value as the reference set pressure differential value ΔPLS0, the correction factor K is 1, and the command current I1 (A·1) is output from the controller 20 to the flow rate control valve 4.

In this manner, by correcting the content of the drive command to the flow rate control valve 4 it is possible to attain the lever operation characteristics M1, M2, M3 which allow the load to be sensed, as illustrated in FIG. 11, in the same way as in the previous aspect.

In the present aspect the load pressure PL1 of the hydraulic cylinder 2 has been detected by means of a pressure sensor, but instead of this it is also possible to use a strain gauge or similar device in order to detect directly the load acting on the hydraulic cylinder 2. Moreover, in the present aspect the lever operation characteristics have been modified in accordance with the load detected separately for a plurality of hydraulic cylinders, but it is also possible to modify the lever operation characteristics in accordance with the maximum load pressure PL. Furthermore, the delivery pressure Pp of the hydraulic pump 1 may be used instead of the load pressure of the hydraulic cylinder.

What is claimed is:

1. A control device for hydraulically driven equipment which is provided with hydraulic actuators driven by feeding delivery pressure oil from a hydraulic pump, and flow rate control valves which feed pressure oil to the corresponding hydraulic actuators at a flow rate dependent upon an operating rate of operation means, and which is configured in such a manner that the flow rate through the flow rate control valves is controlled so that when the operation means is operated beyond a prescribed operating start position, the hydraulic actuators begin to be driven, the flow fed to the hydraulic actuators attaining a prescribed maximum when the operation means is operated to its maximum operating rate, while a rate of change of the flow fed to the hydraulic actuators reaches a prescribed magnitude for each fixed operating rate of the operation means, comprising:

- means for detecting the operating rate of the operation means;
- means for detecting the load acting upon the hydraulic actuators; and
- means for controlling pressure differential between the delivery pressure of the hydraulic pump and the load pressure of the hydraulic actuators, based on the results of detection by the means for detecting operating rate in such a manner that when the operation means is operated until it attains the prescribed maximum operating rate, the rate of change of the flow rate becomes smaller as the load detected by the means of detecting load becomes greater, for the operating rate of the operation means lower than a particular value, while at the same time controlling the flow rate through the flow rate control valves in such a manner that when the operation means is operated until it attains the prescribed maximum operating rate, the flow fed to the hydraulic actuators attains the desired maximum flow rate.

2. The control device for hydraulically driven equipment according to claim 1, wherein the means for controlling pressure differential controls so that the pressure differential between the delivery pressure of the hydraulic pump and the load pressure of the hydraulic actuators beccomes a desired set pressure differential, and modifies the set pressure differential in such a manner that it becomes smaller as the load detected by the means of detecting load becomes greater.

3. A control device for hydraulically driven equipment provided with hydraulic actuators driven by feeding delivery pressure oil from a hydraulic pump, and flow rate control valves which feed pressure oil to the corresponding hydraulic actuators at a flow rate dependent upon the operating rate of the operation means, configured in such a manner that the flow rate through the flow rate control valves is controlled so that when the operation means is operated beyond a prescribed operating start position, the hydraulic actuators begin to be driven, the flow fed to the hydraulic actuators attaining a prescribed maximum when the operation means is operated to its maximum operating rate, while the rate of change of the flow fed to the hydraulic actuators reaches a prescribed magnitude for each fixed operating rate of the operation means, comprising:

means for detecting the operating rate of the operation means;

means for detecting the load acting upon the hydraulic actuators;

means for setting the correspondence of the rate of change of the flow rate to the operating rate of the operation means and the load detected by the means of detecting load in such a manner that when the operation means is operated until it attains the prescribed maximum operating rate, the rate of change of the flow rate becomes smaller as the load detected by the means of detecting load becomes greater, for the operating rate of the operation means lower than a particular value, while at the same time controlling the flow rate through the flow rate control valves in such a manner that when the operation means is operated until it attains the prescribed maximum operating rate, the flow fed to the hydraulic actuators attains the desired maximum flow rate; and means for controlling pressure differential between the delivery pressure of the hydraulic pump and the load pressure of the hydraulic actuators in such a manner that the rate of change of the flow rate in relation to the current operating rate as detected by the means for detecting operating rate and the current load as detected by the means for detecting load is determined on the basis of the correspondence set by the means for setting, and the determined rate of change of the flow rate is attained.

4. A control device for hydraulically driven equipment according to claim 3, wherein means for controlling pressure differential controls so that the pressure differential between the delivery pressure of the hydraulic pump and the load pressure of the hydraulic actuators becomes a desired set pressure differential, the correspondence of the set pressure differential to the operating rate of the operation means and the load detected by the means for detecting load are set by the means for setting, and wherein the means for controlling pressure differential determines the set pressure differential in relation to the current operating rate as detected by the means for detecting operating rate and the current load as detected by the means for detecting load on the basis of the correspondence set by the means for setting, and the set pressure differential being modified to the determined set pressure differential.

* * * * *